United States Patent
Hill

(10) Patent No.: US 6,552,804 B2
(45) Date of Patent: Apr. 22, 2003

(54) APPARATUS AND METHOD FOR INTERFEROMETRIC MEASUREMENTS OF ANGULAR ORIENTATION AND DISTANCE TO A PLANE MIRROR OBJECT

(75) Inventor: Henry Allen Hill, Tucson, AZ (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 09/852,369

(22) Filed: May 10, 2001

(65) Prior Publication Data

US 2002/0001087 A1 Jan. 3, 2002

Related U.S. Application Data

(60) Provisional application No. 60/204,981, filed on May 17, 2000.

(51) Int. Cl.$^7$ ................................. G01B 9/02
(52) U.S. Cl. ........................ 356/510; 356/498
(58) Field of Search ................... 356/486, 487, 356/493, 498, 500, 508, 510

(56) References Cited

U.S. PATENT DOCUMENTS

| | | |
|---|---|---|
| 4,714,339 A | 12/1987 | Lau et al. |
| 4,746,216 A | 5/1988 | Sommargren |
| 4,883,357 A | 11/1989 | Zanoni et al. |

*Primary Examiner*—Samuel A. Turner
(74) *Attorney, Agent, or Firm*—Francis J. Caufield

(57) ABSTRACT

Apparatus and method for simultaneous interferometric measurements of angular orientation of and distance to a plane mirror measurement object using a multiple beam interferometer system. A first and second groups of the multiple beam interferometer systems have beams that contact the measurement object two times and three times, respectively, for simultaneous measurement of one or more of changes in the distance to and changes of the angular orientation in one plane or in two orthogonal planes of the measurement object.

9 Claims, 6 Drawing Sheets

APPARATUS AND METHOD FOR INTERFEROMETRIC MEASUREMENTS OF ANGULAR ORIENTATION AND DISTANCE TO A PLANE MIRROR OBJECT

CROSS-REFERENCE TO RELATED APPLICATION

This application claims priority from U.S. Provisional Patent Application No. 60/204,981 filed May 17, 2000 the contents of which are incorporated herein by reference in their entirety.

BACKGROUND OF THE INVENTION

This invention generally relates to interferometry and more particularly to interferometric apparatus and methods by which highly precise metrology is practiced.

In highly precise metrology, it is required to understand and compensate for changes in the direction of propagation of various individual light beams in which information is encoded about distances or angles under measurement. Changes in the direction of propagation of such beams or in their angular relationships with respect to one another or some reference are often introduced by pitch, yaw, and roll of various optical components in the interferometer as, for example, those that might be experienced by a quickly slewing planar measurement mirror in a plane mirror interferometer, or the like. If such effects are not compensated, it is often not possible to achieve the desired precision required by important industrial applications such as those practiced in the fabrication of semiconductor devices.

In addition, where interferometers have dynamic elements that may be used to control the direction of propagating beams, some means for measuring errors in beam direction and a measurement of a change in an angle is needed to provide feedback signals for controlling such elements.

Consequently, it is a primary object of the present invention to provide apparatus and methods for simultaneous interferometric measurements of angular orientation of and distance to a plane mirror measurement object using a multiple beam interferometer system.

Other objects of the invention will in part appear hereinafter and will in part be obvious when reading the following detailed description in connection with the accompanying drawings.

SUMMARY OF THE INVENTION

Apparatus and method are described for simultaneous interferometric measurements of angular orientation of and distance to a plane mirror measurement object using a multiple beam interferometer system. A first and second groups of the multiple beam interferometer systems have beams that contact the measurement object two times and three times, respectively, for simultaneous measurement of one or more of changes in the distance to and changes of the angular orientation in one plane or in two orthogonal planes of the measurement object.

BRIEF DESCRIPTION OF THE DRAWINGS

The structure, operation, and methodology of the invention, together with other objects and advantages thereof, may best be understood by reading the detailed description in connection with the drawings in which each part has an assigned numeral that identifies it wherever it appears in the various drawings and wherein.

DETAILED DESCRIPTION OF INVENTION

The invention is an apparatus and method for measuring and monitoring interferometrically one or more of the changes in orientation of a measurement object and changes in location of the measurement object comprising a plane mirror. The measurement of changes in two or more quantities may be performed simultaneously. The interferometric measurements are made with a multiple beam interferometer system that has beams that contact the measurement object two or more times.

A number of embodiments of the present invention are described and fall naturally into two groups. A first group comprises double beam interferometer systems and a second group comprises triple beam interferometer systems with beams that contact the measurement object two and three times, respectively. Double beam and triple beam interferometer systems are used herein to mean interferometer systems that have two and three beams, respectively, that are incident on a measurement object.

Figure 1A:
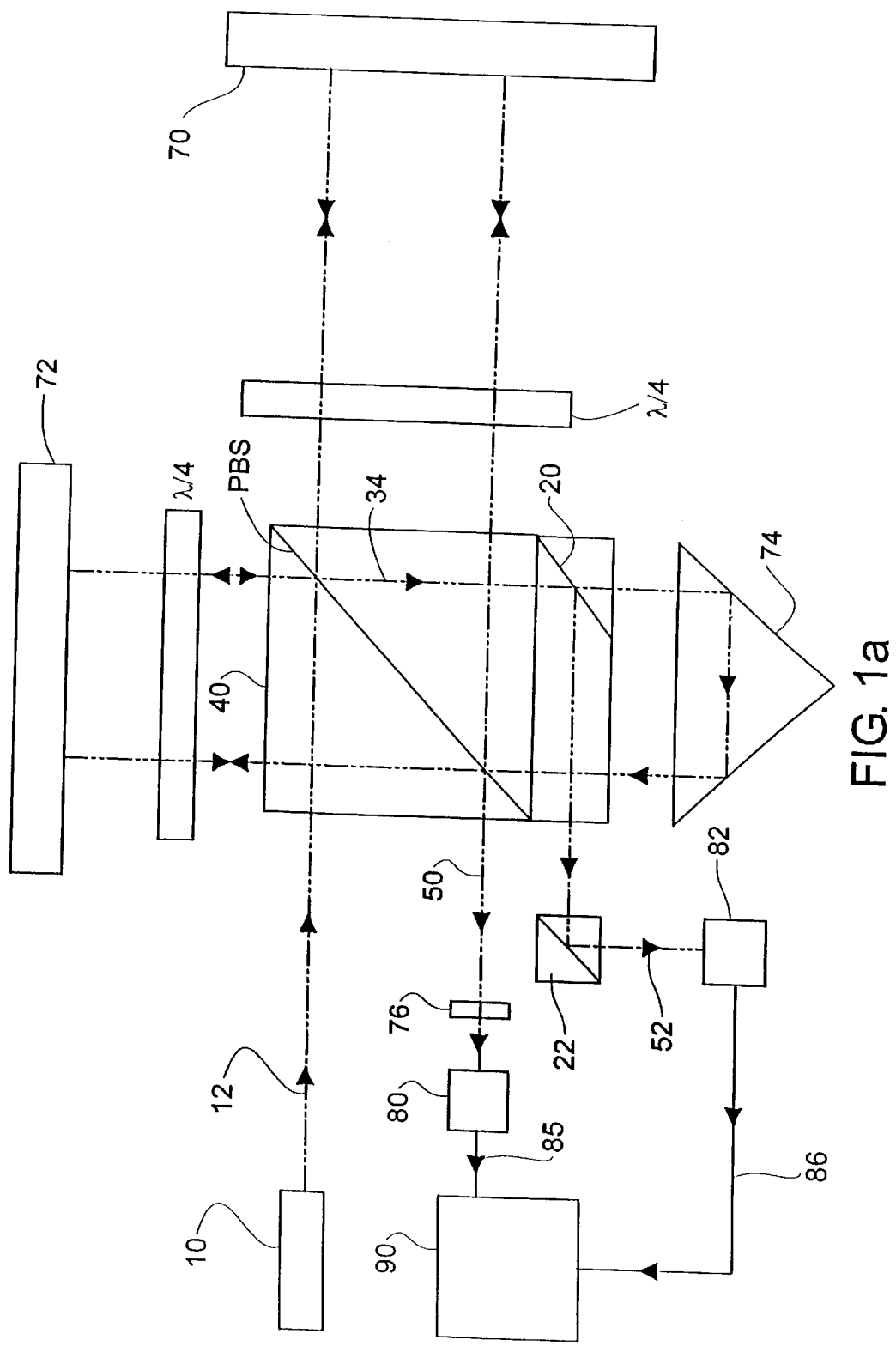
FIG. 1a is a diagrammatic elevational view of a first embodiment of the invention comprising a double beam interferometer system that measures simultaneously changes in the location of an object mirror and in its angular orientation in one plane.

A first embodiment of the present invention is shown schematically in FIG. 1a. The first embodiment is from the first group of interferometers comprising a double beam interferometer system that measures simultaneously changes in location of object mirror 70 and changes in orientation of a object mirror 70 in one plane. The apparatus and method of the first embodiment comprises a High Stability Plane Mirror Interferometer (HSPMI) to measure changes in the optical path length to object mirror 70 and an angle detector to measure changes in orientation of object mirror 70.

Input beam 12 comprises two orthogonally polarized components having a difference in frequencies $f_1$. Source 10 of input beam 12 such as a laser can be any of a variety of frequency modulation apparatus and/or lasers. For example, the laser can be a gas laser, e.g., a HeNe laser, stabilized in any of a variety of conventional techniques known to those skilled in the art, see for example, T. Baer et al., "Frequency Stabilization of a 0.633 μm He-Ne-longitudinal Zeeman Laser," *Applied Optics*, 19, 3173–3177 (1980); Burgwald et al., U.S. Pat. No. 3,889,207, issued Jun. 10, 1975; and Sandstrom et al., U.S. Pat. No. 3,662,279, issued May 9, 1972. Alternatively, the laser can be a diode laser frequency stabilized in one of a variety of conventional techniques known to those skilled in the art, see for example, T. Okoshi and K. Kikuchi, "Frequency Stabilization of Semiconductor Lasers for Heterodyne-type Optical Communication Systems," *Electronic Letters*, 16, 179–181 (1980) and S. Yamaqguchi and M. Suzuki, "Simultaneous Stabilization of the Frequency and Power of an AlGaAs Semiconductor Laser by Use of the Optogalvanic Effect of Krypton," *IEEE J. Quantum Electronics*, QE-19, 1514–1519 (1983).

Two optical frequencies may be produced by one of the following techniques: (1) use of a Zeeman split laser, see for example, Bagley et al., U.S. Pat. No. 3,458,259, issued Jul. 29, 1969; G. Bouwhuis, "Interferometrie Mit Gaslasers," Ned. T. Natuurk, 34, 225–232 (Aug. 1968); Bagley et al., U.S. Pat. No. 3,656,853, issued Apr. 18, 1972; and H. Matsumoto, "Recent interferometric measurements using stabilized lasers," *Precision Engineering*, 6(2), 87–94 (1984); (2) use of a pair of acousto-optical Bragg cells, see for example, Y. Ohtsuka and K. Itoh, "Two-frequency Laser Interferometer for Small Displacement Measurements in a Low Frequency Range," *Applied Optics*, 18(2), 219–224 (1979); N. Massie et al., "Measuring Laser Flow Fields With a 64-Channel Heterodyne Interferometer," *Applied Optics*, 22(14), 2141–2151 (1983); Y. Ohtsuka and M. Tsubokawa, "Dynamic Two-frequency Interferometry for Small Displacement Measurements," *Optics and Laser Technology*, 16, 25–29 (1984); H. Matsumoto, ibid.; P. Dirksen, et al., U.S. Pat. No. 5,485,272, issued Jan. 16, 1996; N. A. Riza and M. M. K. Howlader, "Acousto-optic system for the generation and control of tunable low-frequency signals," *Opt. Eng.*, 35(4), 920–925 (1996); (3) use of a single acousto-optic Bragg cell, see for example, G. E. Sommargren, commonly owned U.S. Pat. No. 4,684,828, issued Aug. 4, 1987; G. E. Sommargren, commonly owned U.S. Pat. No. 4,687,958, issued Aug. 18, 1987; P. Dirksen, et al., ibid.; (4) use of two longitudinal modes of a randomly polarized HeNe laser, see for example, J. B. Ferguson and R. H. Morris, "Single Mode Collapse in 6328 Å HeNe Lasers," *Applied Optics*, 17(18), 2924–2929 (1978); (5) use of birefringent elements or the like internal to the laser, see for example, V. Evtuhov and A. E. Siegman, "A "Twisted-Mode" Technique for Obtaining Axially Uniform Energy Density in a Laser Cavity," *Applied Optics*, 4(1), 142–143 (1965); or the use of the systems described in U.S. Pat. Application with Ser. No. 09/061,928 filed Apr. 17, 1998 entitled "Apparatus to Transform Two Non-Parallel Propagating Optical Beam Components into Two Orthogonally Polarized Beam Components" by H. A. Hill, the contents of which are incorporated herein by reference.

The specific device used for the source of beam 12 will determine the diameter and divergence of beam 12. For some sources, e.g., a diode laser, it will likely be necessary to use conventional beam shaping optics, e.g., a conventional microscope objective, to provide beam 12 with a suitable diameter and divergence for elements that follow. When the source is a HeNe laser, for example, beam-shaping optics may not be required.

The component of beam 12 polarized in the plane of FIG. 1a makes a single pass to object mirror 70 to form a measurement beam component of beam 34. The component of beam 12 orthogonally polarized to the plane of FIG. 1a makes a single pass to reference mirror 72 to form a reference beam component of beam 34. A first portion of beam 34 is transmitted by non-polarizing beam splitter 20 to form output beam 50 after the measurement and reference beam components of the first portion of beam 34 make second passes to object mirror 70 and reference mirror 72, respectively. The remaining description of beam 50 is the same as corresponding portions of the description given for the output beam of a HSPMI. Output beam 50 is detected by the detector 80 as a mixed beam after transmission through polarizer 76 to generate an electrical interference signal or heterodyne signal 85. Polarizer 76 is oriented so as to generate the mixed beam. The phase of the heterodyne signal is processed by the processor 90 to determine changes in the optical path length of the corresponding measurement path comprising a double pass to object mirror 70. Description of the subsequent detection and signal processing of beam 50 is the same as the corresponding portions of the description given for the detection and processing of the output beam of a HSPMI.

A second portion of beam 34 is reflected by non-polarizing beam splitter 20 and a measurement beam component thereof is reflected by polarizing beam splitter 22 as output beam 52. Output beam 52 is incident on detector 82 and detected as signal 86. Processor 90 processes signal 86 and detects any change in direction of propagation of output beam 52 using well known techniques comprising combinations of imaging optics, multiple detectors, multi-element detectors, phase-shifting arrays to alter properties of images formed by the imaging optics, interferometric measurements, and interferometric imaging and signal processing techniques.

Detector 82 and processor 90 can be configured for example to measure a change in direction of beam 52 incident on detector 82 in a plane parallel or orthogonal to the plane of FIG. 1a using one of the interferometric techniques disclosed in commonly owned U.S. Provisional Application No. 60/201,457 filed on May 3, 2000 and converted in part in U.S. patent application Ser. No. 09/842,556 filed on Apr. 26, 2001, entitled "DYNAMIC ANGLE MEASURING INTERFEROMETER by Henry A. Hill, which was published on Mar. 21, 2002 as Pub. No. US 2002/0033951 A1 and the contents of which are incorporated herein by reference.

The direction of reference-beam component of the second portion of beam 34 reflected by non-polarizing beam splitter 20 and transmitted by polarizing beam splitter 22 may also be monitored using one of the apparatus and methods cited with respect to measuring the change in direction of beam 52. The purpose of detecting changes in direction of reference beam component of the second portion of beam 34 would be for making corrections for changes in the direction of input beam 12 (not shown in FIG. 1a) and/or changes in the double beam interferometer system of the first embodiment.

Retroreflector 74 shown in FIG. 1a may be a corner cube retroreflector or a polarization preserving retroreflector, preferably a polarization preserving retroreflector, such as disclosed in copending, commonly owned U.S. patent application with Ser. No. 09/384,742, filed Aug. 27, 1999, and entitled "Polarization Preserving Optical Systems" by Henry A. Hill and copending, commonly owned U.S. patent application with Ser. No. 09/384,855, filed Aug. 27, 1999, and entitled "Interferometers Utilizing Polarization Preserving Optical Systems" by Henry A. Hill and Peter J. de Groot, the contents of the copending applications being incorporated herein by reference. When using an interferometric technique to measure and monitor changes in orientation of object mirror 70, the phase of the electrical interference signal 86 may be determined using either heterodyne or homodyne techniques.

The description of the first embodiment of the present invention noted that the configuration of one of the interferometers comprising the interferometer system illustrated in FIG. 1a is known in the art as a HSPMI. Other forms of the plane mirror interferometer and forms of other interferometers such as the differential plane mirror interferometer or the angle-compensating interferometer or similar device such as is described in an article entitled "Differential interferometer arrangements for distance and angle measurements: Principles, advantages and applications" by C. Zanoni, VDI Berichte Nr. 749, 93–106 (1989), is preferably incorporated into the apparatus of the first embodiment of the present invention as when working with stages commonly encountered in the micro-lithographic fabrication of integrated circuits without significantly departing from the spirit and scope of the present invention.

Figure 1B:
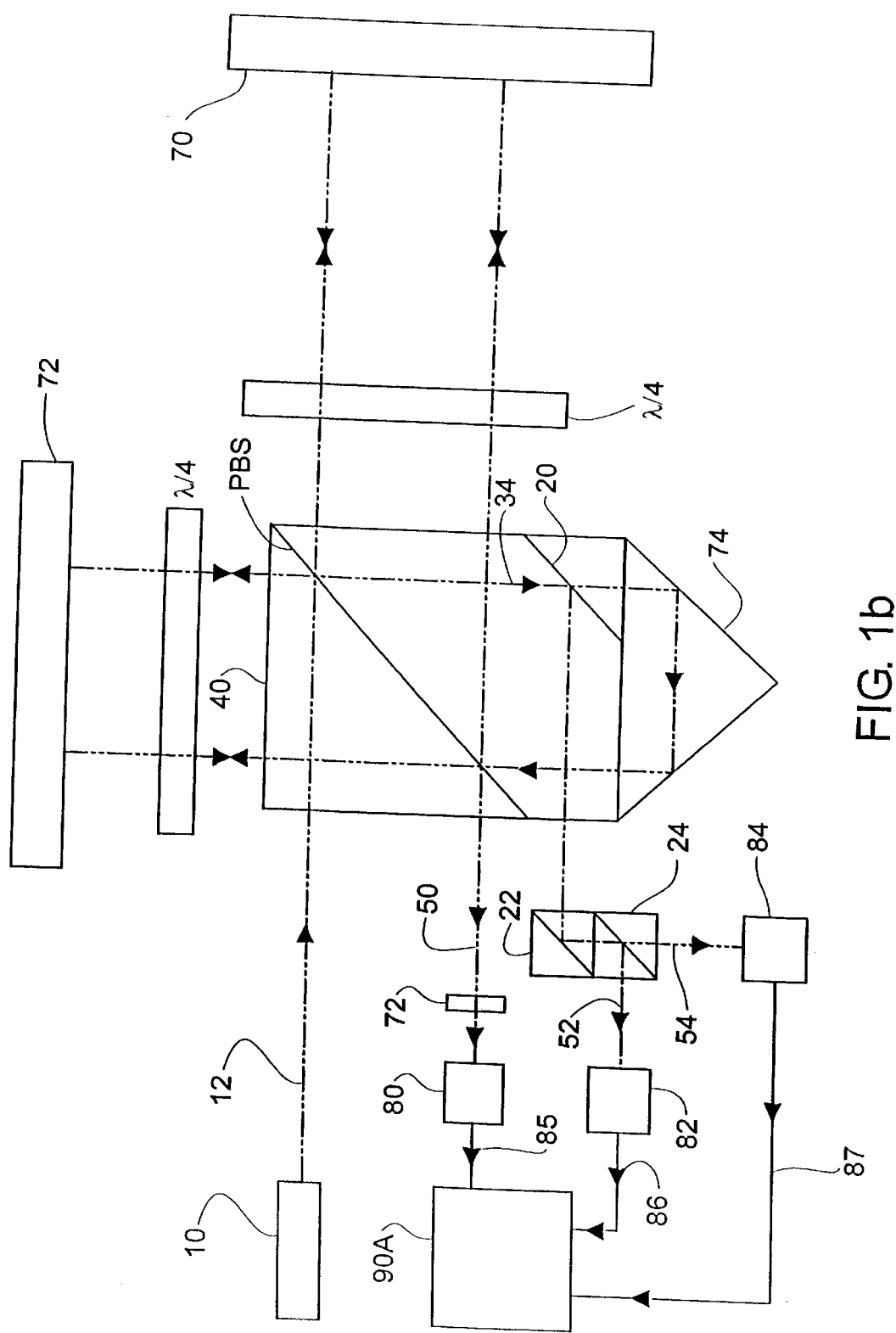
FIG. 1b is a diagrammatic elevational view of a variant of the embodiment of FIG. 1a comprising a double beam interferometer system comprising a high stability plane mirror interferometer (HSPMI) and an angle detector to measure changes in the orientation of an object mirror in two orthogonal planes.

A variant of the first embodiment of the present invention is shown schematically in FIG. 1b. The variant of the first embodiment is from the first group of interferometer systems comprising a double beam interferometer system. The apparatus and method of the variant of the first embodiment comprises a HSPMI and an angle detector to measure changes in orientation of object mirror 70 in two orthogonal planes. The variant of the first embodiment of the present invention simultaneously measures changes optical path to an object and changes in orientation of the object in two orthogonal planes.

The measurement beam component of the portion of beam 34 reflected by non-polarizing beam splitter 20 is reflected by polarizing beam splitter 22 and a first and second portions thereof reflected and transmitted, respectively, by non-polarizing beam splitter 24 as a second and third output beams 52 and 54, respectively. Beam 52 is detected by detector 82 as signal 86 and processor 90A processes signal 86 for a measurement of changes in orientation of object mirror 70 in a plane parallel to the plane of FIG. 1b. Beam 54 is detected by detector 84 as signal 87 and processor 90A processes signal 87 for a measurement of changes in orientation of object mirror 70 in a plane orthogonal to the plane of FIG. 1b.

The description of detectors 82 and 84 and processor 90A is the same as corresponding portions of the description given for detector 82 and processor 90 of the first embodiment of the present invention.

Figure 2A:
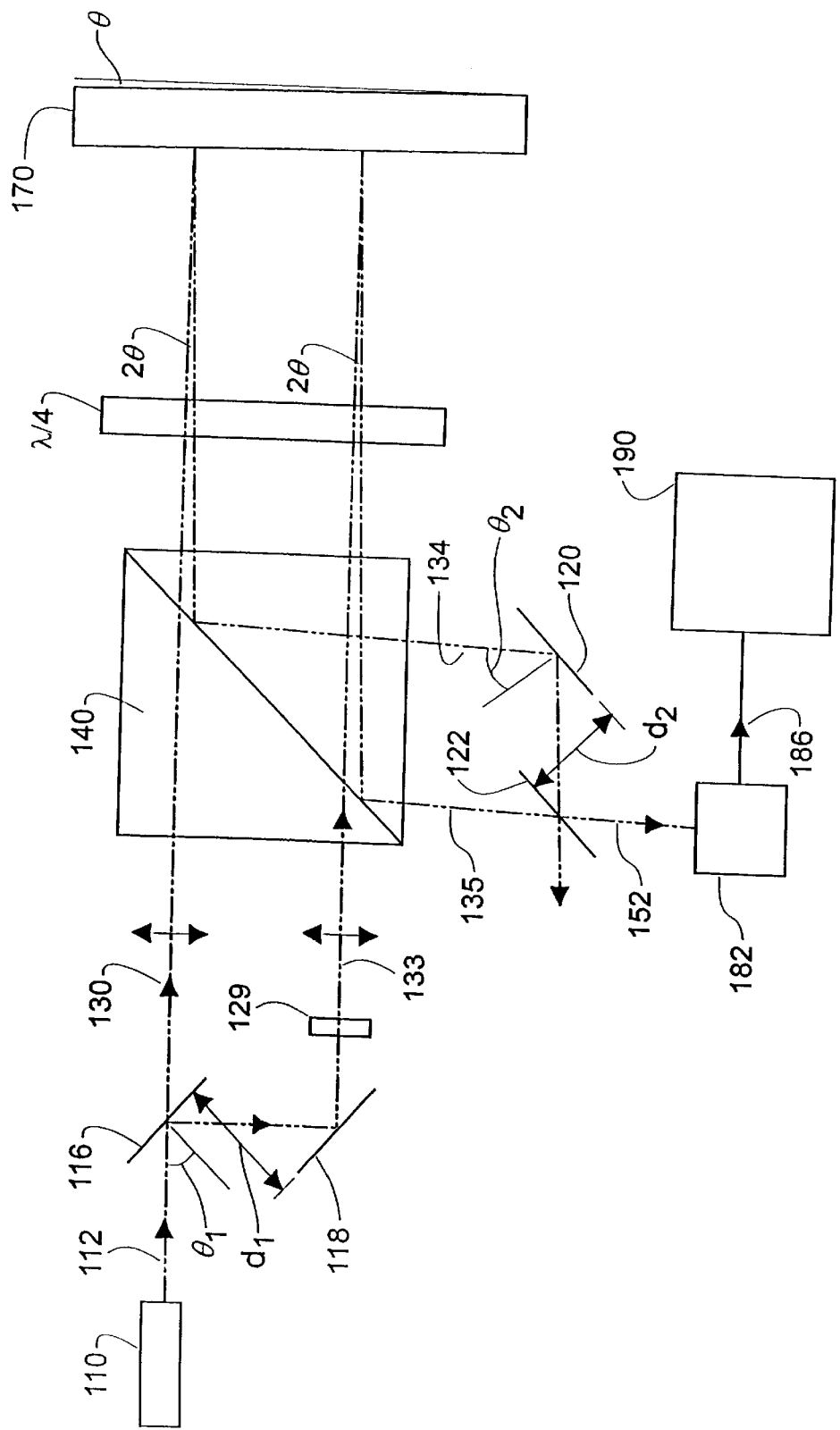
FIG. 2a is a diagrammatic elevational view of a second embodiment of the invention and comprises an interferometer wherein the reference and measurement objects are the same plane mirror, each of the reference and measurement beams making one pass to the mirror.

A second embodiment of the present invention is shown schematically in FIG. 2a. The second embodiment is from the first group of interferometers comprising a double beam interferometer that measures changes in the orientation of a measurement object in one plane. The apparatus and method of the second embodiment comprises an interferometer wherein the reference and measurement objects are the same plane mirror 170. Each of the reference and measurement beams make one pass to plane mirror 170.

The description of input beam 112 is the same as corresponding portions of the description given for input beam 12 of the first embodiment. The directions of propagation of the two frequency components of input beam 112 are the same for the second embodiment. However, the directions of propagation of the two frequency components of input beam 112 may be different depending on an end use application. Input beam 112 impinges on polarizing beam splitter 116 and a portion thereof transmitted as measurement beam 130. Measurement beam 130 is polarized in the plane of FIG. 2a. A second portion of input beam 112 is reflected by polarizing beam splitter 116, reflected by mirror 118, and subsequently transmitted by half wave phase retardation plate 129 as reference beam 133. Retardation plate 129 is orientated so as to rotate the plane of polarization of beam 133 to be parallel to plane of FIG. 2a.

Polarizing beam splitter 116 and mirror 118 are parallel and spatially separated by a distance $d_1$ as shown in FIG. 2a. The angle of incidence of input beam 112 at polarizing beam splitter 116 is $\theta_1$.

Beams 130 and 133 impinge on polarizing beam splitter 140 and exit as beams 134 and 135, respectively. The measurement and reference beams have both been reflected once by measurement/reference object 170. Measurement/reference object 170 is a plane mirror. Beams 134 and 135 are polarized orthogonal to the plane of FIG. 2a.

Beam 134 is reflected by mirror 120 and a portion thereof reflected by non-polarizing beam splitter 122 as a measurement beam component of output beam 152. A portion of beam 135 is transmitted by non-polarizing beam splitter 122 as a reference beam component of output beam 152. Output beam 152 is a mixed beam.

Beam splitter 122 and mirror 120 are parallel and spatially separated by a distance $d_2$ as shown in FIG. 2a. The angle of incidence of beam 134 at mirror 120 is $\theta_2$.

Output beam 152 is detected, preferably by photoelectric detection, by detector 182 as electrical interference signal 186.

Signal 186 is a heterodyne signal having a frequency equal to $f_1$ and a heterodyne phase $\phi$. Heterodyne phase $\phi$ may be expressed as $$\phi = 2nk[d_2 \cos\theta_2 - d_1 \cos\theta_1] \qquad (1)$$

where k is the wavenumber of input beam 112 and n is the index of refraction of the medium in the interferometer system. A change in orientation of mirror 170 by an angle $\theta$ will introduce a change of $2\theta$ in $\theta_2$ relative to $\theta_1$ with a corresponding change $\Delta\phi$ in phase $\phi$ given by the formula $$\Delta\phi = 2nkd_2[\cos(\theta_2 + 2\theta) - \cos\theta_2] \qquad (2)$$

The corresponding equation for $\theta$ expressed in terms of $\Delta\phi$ is $$\theta = \left(\frac{1}{2}\right)\left[\cos^{-1}\left(\cos\theta_2 + \frac{\Delta\phi}{2nkd_2}\right) - \theta_2\right]. \qquad (3)$$

For an example of $d_2 = 1.0$ cm and a wavelength of 633 nm, the coefficient $[1/(2nkd_2)]$ has the value of $$\frac{1}{2nkd_2} = 5.04 \times 10^{-6}. \qquad (4)$$

Measurement of an angle is based on an optical differencing technique wherein the measured phase difference between the measurement and reference beams is not sensitive in first order to effects of a common mode frequency shift of the two components of input beam 112. Common mode frequency shifts can be generated for example as Doppler shifts resulting from translations of mirror 170.

Improved accuracy in measurements of orientation of the measurement/reference object can be obtained by operating at low frequency split between the measurement and reference beams. The option to use a low frequency split in the present invention is a direct consequence of the absence of first order frequency shift effects in the phase of the electrical interference signal used to measure and monitor changes in orientation of the mirror 170.

The phase of the electrical interference signal used to measure and monitor changes in orientation of the measurement/reference object may be determined using either heterodyne or homodyne techniques.

Figure 2B:
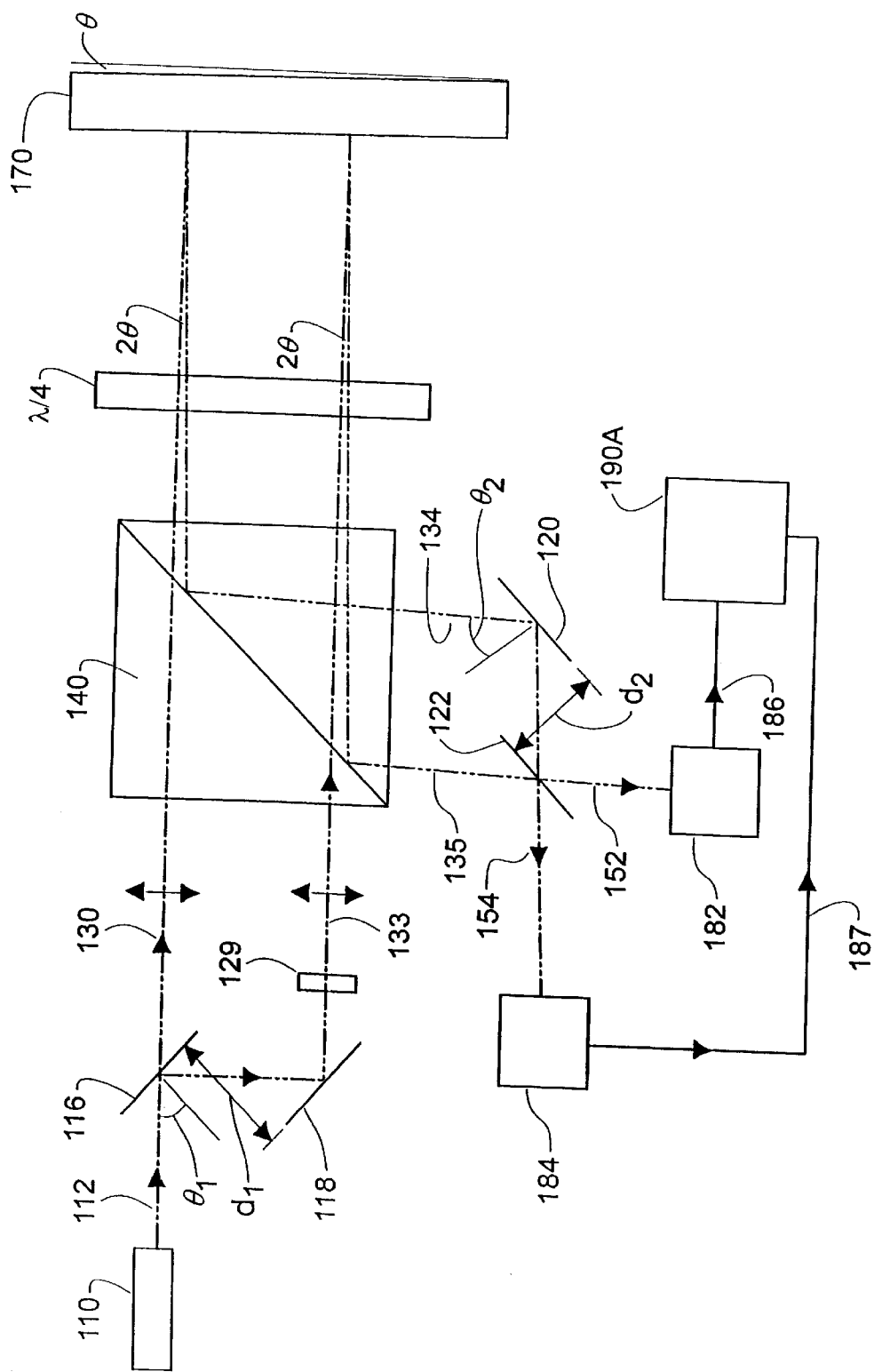
FIG. 2b is a diagrammatic elevational view of a variant of the embodiment of FIG. 2a and comprises a double beam interferometer system that measures changes in the orientation of a measurement object in two orthogonal planes simultaneously.

A variant of the second embodiment is shown schematically in FIG. 2b. The variant of the second embodiment is from the first group of interferometers comprising a double beam interferometer system that measures changes in the orientation of a measurement object in two orthogonal planes simultaneously. The apparatus and method of the variant of the second embodiment comprises the interferometer of the second embodiment and detector 84 and processor 190A. A portion of beam 134 reflected by mirror 120 is transmitted by non-polarizing beam splitter 122 as a measurement beam component of a second output beam 154 and a portion of beam 135 is reflected by non-polarizing beam splitter 122 as a reference beam component of beam 154. Beam 154 is detected by detector 184 as signal 187 and processor 190A processes beam 187 for a measurement of changes in orientation of mirror 170 in a plane orthogonal to the plane of FIG. 2b.

Detector 184 and processor 190A detect a change in directions of propagation of the measurement and reference beams using well known techniques comprising combinations of imaging optics, multiple detectors, multi-element detectors, phase-shifting arrays to alter properties of images formed by the imaging optics, interferometric measurements, and interferometric imaging and signal processing techniques. Detector 184 and processor 190A can be configured for example to measure the change in direction of beams incident on detector 184 in a plane orthogonal to the plane of FIG. 2b using one of the interferometric techniques disclosed in cited U.S. Provisional Application (Z-209).

The remaining description of the variant of the second embodiment of the present invention is the same as corresponding portions of the description given for the second embodiment of the present invention.

Figure 3A:
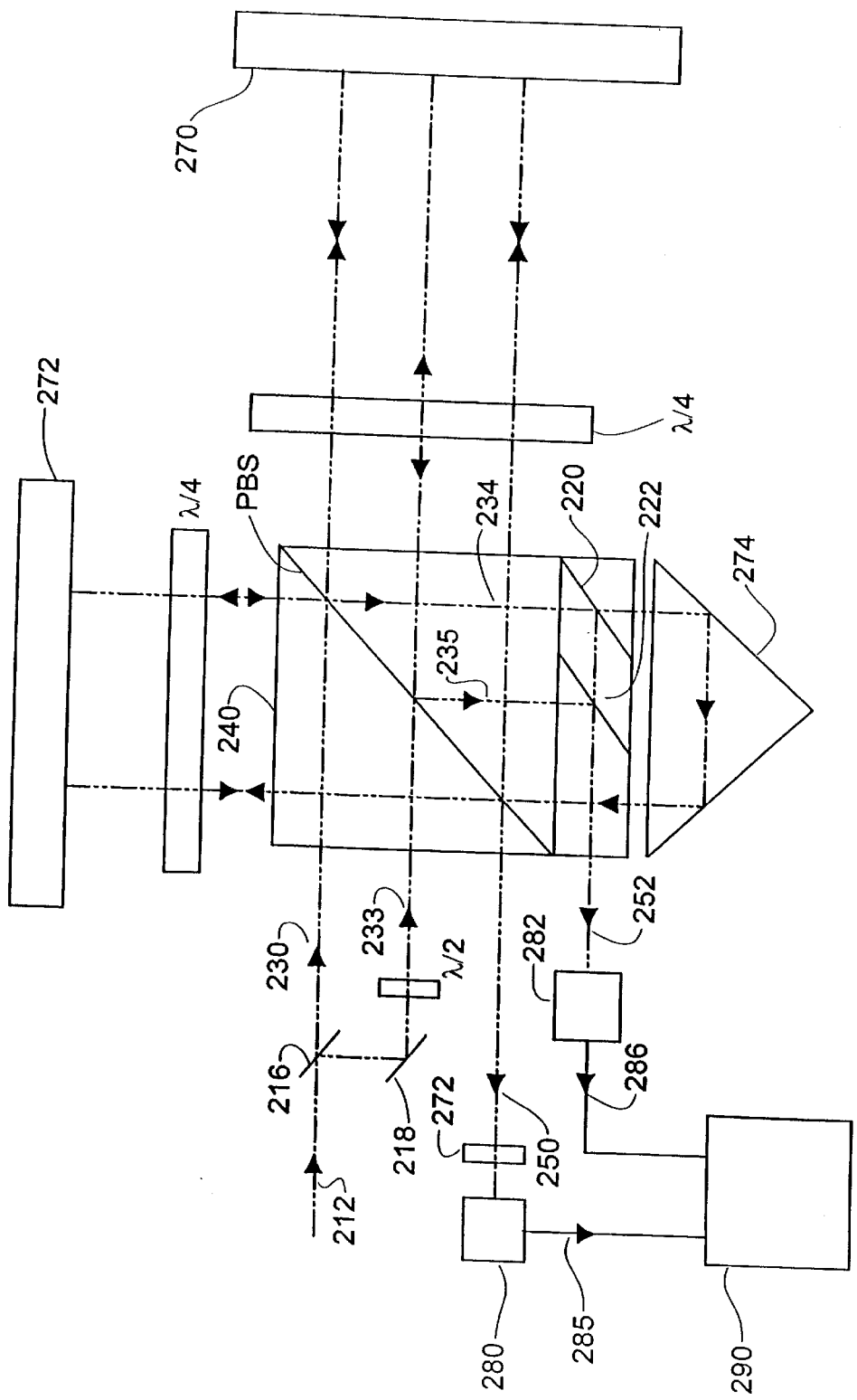
FIG. 3a is a diagrammatic elevational view of a third embodiment using triple beams and comprises a HSPMI and a second interferometer of the type of the second embodiment to measure changes in distance to an object and changes in its angular orientation in one plane simultaneously where one of the triple beams is used both as one of the beams of the HSPMI and as one of the beams of the second interferometer.

A third embodiment of the present invention is shown schematically in FIG. 3a. The third embodiment is from the second group of interferometer systems comprising a triple beam interferometer system. Apparatus and method of the second embodiment comprises a HSPMI and a second interferometer of the type of the second embodiment of the present invention to measure changes in distance to an object and changes in orientation of the object in one plane simultaneously. One of the triple beams is used both as one of the beams of the HSPMI and as one of the beams of the second interferometer.

Description of input beam 212 is the same as corresponding portions of the description given for the description of input beam 12 of the first embodiment. Beam 212 is incident on non-polarizing beam splitter 216 and a first portion thereof transmitted as beam 230. A second portion of beam 212 is reflected by non-polarizing beam splitter 216, reflected by mirror 218, and then transmitted by a half wave phase retardation plate as beam 233. The half wave phase retardation plate is oriented such that the polarizations of the frequency shifted components of beams 230 and 233 are orthogonal and the polarizations of the non-frequency shifted components of beams 230 and 233 are orthogonal.

The component of beam 230 polarized in the plane of FIG. 3a makes a single pass to object mirror 270 to form a measurement beam component of beam 234. The component of beam 230 orthogonally polarized to the plane of FIG. 1a makes a single pass to reference mirror 272 to form a reference beam component of beam 234. A first portion of beam 234 is transmitted by non-polarizing beam splitter 220 to form output beam 250 after the measurement and reference beam components of the first portion of beam 234 make second passes to object mirror 270 and reference mirror 272, respectively. The remaining description of beam 250 is the same as corresponding portions of the description given for the output beam of a HSPMI. Output beam 250 after transmission through polarizer 272 as a mixed beam is detected by detector 280 to generate an electrical interference signal or heterodyne signal 285. The phase of the heterodyne signal 285 is processed by processor 290 to determine changes in the optical path length of the corresponding measurement path comprising a double pass to object mirror 270. Description of the subsequent detection and signal processing of beam 250 is the same as the corresponding portions of the description given for the detection and processing of the output beam of a HSPMI.

A second portion of beam 234 reflected by non-polarizing beam splitter 220 is transmitted by non-polarizing beam splitter 222 as the measurement beam component of output beam 252. A second portion of beam 235 is reflected by non-polarizing beam splitter 222 as a reference beam component of beam 252. Components of beam 252 orthogonally polarized to the plane of FIG. 3a are detected by detector 252 for determination of a change in direction of the components of beam 252 in the plane of FIG. 3a and therefore a change in orientation of object mirror 270 in the plane of FIG. 3a. The description of the reference and measurement beam components of beam 252 and the subsequent detection and signal processing is the same as corresponding portions of the description given for output beam 152 of the second embodiment of the present invention.

The remaining description of the third embodiment is the same as corresponding portions given for the description of the first and second embodiments of the present invention.

Figure 3B:
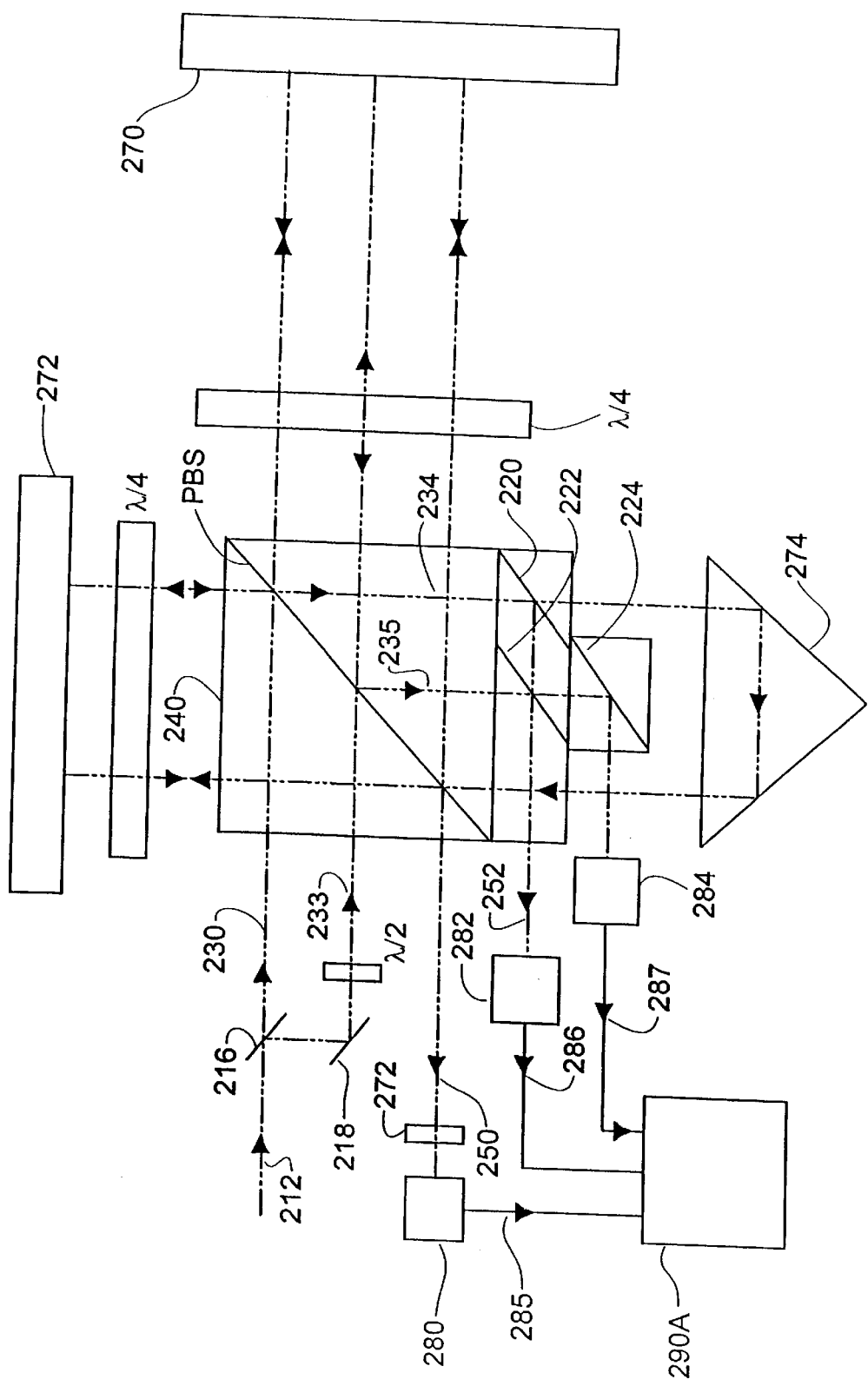
FIG. 3b is a diagrammatic elevational view that is a triple beam variant of the third embodiment and comprises a HSPMI and the double beam interferometer of the variant of the second embodiment to simultaneously measure changes in distance to an object and changes in its angular orientation in two orthogonal planes.

A variant of third embodiment of the present invention is shown schematically in FIG. 3b. The variant of the third embodiment is from the second group of interferometer systems comprising a triple beam interferometer system. The apparatus and method of the variant of the third embodiment comprises a HSPMI and the double beam interferometer system of the variant of the second embodiment of the present invention. The variant of third embodiment of the present invention simultaneously measures changes in distance to an object and changes in orientation of the object in two orthogonal planes.

The remaining description of the variant of the third embodiment is the same as corresponding portions of the description given for the variant of the second embodiment and the third embodiment of the present invention.

Cyclic error contributions to the interferometric measurements performed in the first, second, and third embodiments of the present invention and variants thereof can be reduced and/or measured and compensated in part or whole, as required by an end use application, with the incorporation of methods and apparatus such as described in G. Wilkening and W. Hou, U.S. Pat. No. 5,331,400 entitled "Heterodyne Interferometer Arrangement" issued Jul. 19, 1994; in copending, commonly owned U.S. patent application with Ser. No. 09/168,200 by S. R. Paterson, V. G. Bagdami, and C. A. Zanoni entitled "Interferometry System Having Reduced Cyclic Errors" filed Oct. 06, 1998; in copending, commonly owned U.S. patent application with Ser. No. 09/268,619 by H. A. Hill entitled "Systems and Methods For Characterizing Cyclic Errors In Distance Measuring and Dispersion Interferometry" filed Mar. 15, 1999; and in copending, commonly owned U.S. patent application with Ser. No. 60/166,639(Z-163) by H. A. Hill entitled "Systems and Methods For Quantifying Cyclic Errors In Interferometry Systems" filed Nov. 19, 1999. The contents of the three copending applications are incorporated herein by reference.

The angle and linear displacement calculations in the embodiments in the first and second groups of embodiments and variants of the present invention depend on the refractive index of the gas in the measurement path. Changes in the refractive index, caused for example by air turbulence along the measurement path, can therefore alter the angle and displacement measurements. To compensate for such effects any of the interferometry systems described above can involve measurement and reference beams that include at least two separate wavelength components, e.g., dispersion interferometry. The reference and measurement beam components at each wavelength are combined with one another to form an overlapping pair of exit beams. Interferometric signals, e.g., phases $\phi_i$, at each wavelength are then derived from the respective overlapping pair of exit beams. Configuring interferometry systems such as those described above for measurements at multiple wavelengths is described in U.S patent application Ser. No. 09/305,876, filed May 5, 1999, and entitled "Single-Pass and Multi-Pass Interferometry Systems Having a Dynamic Beam-Steering Assembly For Measuring Distance, Angle, and Dispersion" by Henry A. Hill and Peter de Groot, U.S. Patent Application Ser. No. 09/252,266 filed in the names of Peter de Groot, Henry A. Hill, and Frank C. Demarest on Feb. 18, 1999 and entitled "Interferometer And Method For Measuring The Refractive Index And Optical Path Length Effects Of Air", and U.S. patent application Ser. No. 09/252,440 filed in the names of Peter de Groot, Henry A. Hill, and Frank C. Demarest on Feb. 18, 1999 and entitled "Apparatus And Method For Measuring The Refractive Index And Optical Path Length Effects Of Air Using Multiple Pass Interferometry", the contents of which are incorporated herein by reference. [Frank, please add references to Z-170 and Z-171.]

In such embodiments, the processing systems and/or angle measuring systems in the embodiments described above will process respective phases $\phi_i$ at two or more wavelengths, in other words, the phases $\phi_i$ are now further indexed with respect to wavelength according to $\phi_{ij}=\phi_i(\lambda_j)$, where $\lambda_j$ specifies the wavelength of the particular component. The processing systems and/or angle measuring systems then calculate the refractive effects of the gas on the angular displacement measurements as described below.

The angular orientations measured for the measurement object by one of the first, second, and third embodiments and variants thereof of the present invention may need to be corrected for the refractive effects of gas in a respective measurement path according to an end use application. The correction $\Delta\theta_i$, for $\theta_i$ of the first, second, and third embodiments and variants thereof, is expressed as $$\Delta\theta_i = -\int_i \left(\frac{\partial n}{\partial r}\right) ds. \tag{5}$$

The correction $\Delta\theta_i$ can be rewritten to a good approximation in terms of a gradient of a dispersion and the reciprocal dispersive power $\Gamma$ of the gas. The reciprocal dispersive power $\Gamma$ is an intrinsic optical property of the gas and is defined as $$\Gamma = \frac{(n_l - 1)}{n_q - n_u} \tag{6}$$

where l, q, and u are indices corresponding to wavelengths $\lambda_l$, $\lambda_q$, and $\lambda_u$, respectively, q≠u, used in the dispersion interferometry. For a gas where there are no significant gradients in the composition of the gas in the measurement path, Eq. (5) and Eq. (6) can be combined to yield $$\Delta\theta_i = -\Gamma \int_i \left[\frac{\partial(n_q - n_u)}{\partial r}\right] ds \quad \text{or} \tag{7}$$

$$\Delta\theta_i = -\Gamma \left[\int_i \left(\frac{\partial n_q}{\partial r}\right) ds - \int_i \left(\frac{\partial n_u}{\partial r}\right) ds\right]. \tag{8}$$

The difference in the gradients of the refractivity are obtained from the difference in the measured $\theta_i$ at the respective wavelengths where the measured $\theta_i$ are uncorrected for refractive effects of the gas. In particular, the processing systems and/or angle measuring systems can calculate the correction according to Eq. (9)

$$\Delta\theta_i = -\Gamma\{\theta_{iq} - \theta_{iu}\}, \tag{9}$$

where $\theta_{iq}$ and $\theta_{iu}$ correspond to the measured angles for wavelengths $\lambda_q$ and $\lambda_u$, respectively, from the first, second, and third embodiments (the index i denoting the respective embodiment) and variants thereof. The measured angles $\theta_{iq}$ and $\theta_{iu}$, of course, do not include the refractive index gradient correction otherwise shown in the equations shown above for $\theta_i$ of the first, second, and third embodiments and variants thereof. Note that corrections of the refractive effects of the gas on angular and linear displacement measurements both use the same intrinsic property of the gas, the reciprocal dispersive power $\Gamma$. Thus, the reciprocal dispersive power $\Gamma$ can be used to correct interferometric and non-interferometric measurements of angle for air turbulence and the like by making the interferometric and non-interferometric angle measurement at two or more wavelengths and applying Eq. (9). Measurements and methods for determination of $\Gamma$ are described in copending, commonly owned U.S. patent application Ser. No. 09/232,515, filed Jan. 19, 1999, entitled "Apparatus And Methods For Measuring Intrinsic Optical Properties Of A Gas" by Henry A. Hill, the contents of which are incorporated herein by reference.

It will be evident to those skilled in the art that certain of the interferometric measurements of changes in angular orientations are not sensitive to translations of a respective object mirror, i.e. Doppler shifts are not present in phases of electrical interference signals. This is an advantage with respect to making precision measurements of phases of the electrical interference signals.

It will be further evident to those skilled in the art that techniques and procedures incorporated in the double and triple beam interferometer systems of the first, second, and third embodiments and variants thereof may be extended to four or more beam interferometric systems without departing from the spirit or scope of the present invention.

What is claimed is:

1. Apparatus for interferometrically measuring at least one of the position and angular orientation of a plane object mirror, said apparatus comprising:

an interferometer having reference and measurements paths and including a plane mirror in said measurement path, said interferometer being structured and arranged to generate a reference and measurement beam for travel along said reference and measurement paths, respectively, where the measurement beam travels to said plane object mirror at least twice, contacting it at two spatially separate locations in the process, and thereafter is mixed with said reference beam to provide a signal having a property that varies in accordance with changes in the location to said plane object mirror such that said signal is substantially independent of angular changes in said plane mirror about at least one axis orthogonal to the measurement path thereof;

optical means arranged to intercept at least said measurement beam after one transit to said plane object mirror to generate an optical signal containing information that varies in at least one plane in accordance with the angular orientation of said plane object mirror; and means for receiving said optical signal, converting it to an electrical signal, determining said information therefrom, and converting said information to said angular orientation of said plane object mirror.

2. The apparatus of claim 1 wherein said optical means is further configured to generate a second optical signal having additional information that varies in a plane orthogonal to said at least one plane in accordance with the angular orientation of said plane object mirror in said orthogonal plane.

3. Apparatus for interferometrically measuring at least one angular orientation of a plane object mirror; said apparatus comprising:

an interferometer including said plane object mirror;

a source for generating at least one light beam;

optical means for intercepting said at least one light beam and spatially separating it into two light beams that are separated by a first predetermined distance and travel to said plane object mirror as measurement beams, reflect from said plane object mirror, and emerge from said interferometer as exit beams spatially separated by a second predetermined distance;

means for combining said exit beams to provide an output signal whose phase varies in accordance with variations in the angular orientation of said plane object mirror in at least one plane;

means for determining said angular orientation from said phase of said signal.

4. The apparatus of claim 3 wherein said means for combining said exit beams to provide an output signal is configured to generate a second output signal having another phase that varies in a plane orthogonal to said at least one plane in accordance with the angular orientation of said plane object mirror in said orthogonal plane.

5. Apparatus for interferometrically measuring at least one of the position and angular orientation of a plane object mirror, said apparatus comprising:

a first interferometer having a reference and measurement path and including a plane mirror in said measurement path, said interferometer being structured and arranged to generate a reference and a first measurement beam for travel along said reference and said measurement paths, respectively, where said first measurement beam travels to said plane object mirror at least twice, contacting it at two spatially separate locations in the process, and thereafter is mixed with said reference beam to provide a signal having a property that varies in accordance with changes in the location to said plane object mirror such that said signal is substantially independent of angular changes in said plane mirror about at least one axis orthogonal to the measurement path thereof;

a second interferometer having a measurement leg, said plane object mirror being in said second interferometer measurement leg;

means for generating a second measurement beam for travel along said second interferometer measurement leg to said plane object mirror only once;

optical means arranged to intercept at least said first interferometer measurement beam after one transit to said plane object mirror and said measurement beam from said second interferometer to generate an optical signal having information that varies in at least one plane in accordance with the angular orientation of said plane object mirror; and means for receiving said optical signal, converting it to an electrical signal, determining said information therefrom, and converting said information to said angular orientation of said plane object mirror.

6. The apparatus of claim 5 wherein said optical means is further configured to generate a second optical signal having additional that varies in a plane orthogonal to said at least one plane in accordance with the angular orientation of said plane object mirror is said orthogonal plane.

7. Apparatus for interferometrically measuring at least one angular orientation of a plane object mirror; said apparatus comprising:

an interferometer including said plane object mirror;

a source for generating at least one light beam;

optical means for intercepting said at least one light beam and spatially separating it into two light beams that are separated by a first predetermined distance and travel to said plane object mirror as measurement beams, reflect from said plane object mirror, and emerge from said interferometer as exit beams spatially separated by a second predetermined distance;

means for combining said exit beams to provide an output signal whose phase varies in accordance with variations in the angular orientation of said plane object mirror in at least one plane;

means for determining said angular orientation from said phase of said signal, wherein said means for combining said exit beams to provide an output signal is configured to generate a second output signal having another phase that varies in a plane orthogonal to said at least one plane in accordance with the angular orientation of said plane object mirror in said orthogonal plane.

8. Apparatus for interferometrically measuring at least one of the position and angular orientation of a plane object mirror, said apparatus comprising:

an interferometer having reference and measurements paths and including a plane mirror in said measurement path, said interferometer being structured and arranged to generate a reference and measurement beam for travel along said reference and measurement paths, respectively, where the measurement beam travels to said plane object mirror at least twice, contacting it at two spatially separate locations in the process, and thereafter is mixed with said reference beam to provide a signal having a property that varies in accordance with changes in the location to said plane object mirror such that said signal is substantially independent of angular changes in said plane mirror about at least one axis orthogonal to the measurement path thereof;

interferometric angular measurement means arranged to intercept at least said measurement beam after one transit to said plane object mirror to generate an optical signal containing information that varies in at least one plane in accordance with the angular orientation of said plane object mirror; and means for receiving said optical signal, converting it to an electrical signal, determining said information therefrom, and converting said information to said angular orientation of said plane object mirror.

9. The apparatus of claim 8 wherein said interferometric angular measurement means comprises an etalon.

* * * * *